(12) United States Patent
Kohge et al.

(10) Patent No.: US 6,643,572 B2
(45) Date of Patent: Nov. 4, 2003

(54) CONTROLLER FOR AUTOMOBILE

(75) Inventors: Shinichi Kohge, Tokyo (JP); Yuji Kishimoto, Tokyo (JP)

(73) Assignee: Mitsubushi Denki Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 55 days.

(21) Appl. No.: 09/319,037

(22) PCT Filed: Oct. 2, 1997

(86) PCT No.: PCT/JP97/03531

§ 371 (c)(1),
(2), (4) Date: Jun. 1, 1999

(87) PCT Pub. No.: WO99/17976

PCT Pub. Date: Apr. 15, 1999

(65) Prior Publication Data

US 2001/0044684 A1 Nov. 22, 2001

(51) Int. Cl.⁷ .................. A01B 69/00; G01M 17/00; G06F 19/00; G06F 7/00; G06F 9/44
(52) U.S. Cl. ............... 701/41; 701/29; 701/33; 701/35; 701/36; 717/168
(58) Field of Search .................. 701/33, 35, 36, 701/41, 29; 340/438, 439; 717/168, 169, 170, 171, 172, 173

(56) References Cited

U.S. PATENT DOCUMENTS

| | | | | |
|---|---|---|---|---|
| 5,091,856 A | * | 2/1992 | Hasegawa et al. | 701/36 |
| 5,278,759 A | * | 1/1994 | Berra et al. | 701/1 |
| 5,473,540 A | * | 12/1995 | Schmitz | 701/1 |
| 5,541,840 A | * | 7/1996 | Gurne et al. | 701/33 |
| 5,555,498 A | * | 9/1996 | Berra et al. | 701/33 |
| 5,794,164 A | * | 8/1998 | Beckert et al. | 701/1 |
| 5,802,485 A | * | 9/1998 | Koelle et al. | 701/29 |
| 5,826,205 A | * | 10/1998 | Koelle et al. | 701/29 |
| 5,940,074 A | * | 8/1999 | Britt, Jr. et al. | 345/333 |
| 5,999,867 A | * | 12/1999 | Rogers et al. | 701/29 |
| 6,108,598 A | * | 8/2000 | Sumitani | 701/29 |
| 6,148,441 A | * | 11/2000 | Woodward | 711/163 |

FOREIGN PATENT DOCUMENTS

| | | |
|---|---|---|
| JP | 60-211504 | 10/1985 |
| JP | 61-115771 | 6/1986 |
| JP | 63-90738 | 4/1988 |
| JP | 63-223901 | 9/1988 |
| JP | 4-36048 | 2/1992 |
| JP | 5-38969 | 2/1993 |
| JP | 5-147476 | 6/1993 |

* cited by examiner

Primary Examiner—William A. Cuchlinski, Jr.
Assistant Examiner—Brian J Broadhead
(74) Attorney, Agent, or Firm—Sughrue Mion, PLLC

(57) ABSTRACT

A nonvolatile memory built in a vehicle control computer and storing control software and an auxiliary storage for setting an unerasable region to the nonvolatile memory and updating the control software in an erasable region to new control software are used.

4 Claims, 3 Drawing Sheets

CONTROLLER FOR AUTOMOBILE

TECHNICAL FIELD

The present invention relates to a vehicle controller capable of changing control software to a control algorithm newly developed to improve the performance early and by a relatively inexpensive apparatus in a market after selling a vehicle.

BACKGROUND ART

An electric-power-steering controller is described below as one of the conventional vehicle controllers. FIG. 3 is a circuit diagram of the conventional power-steering controller disclosed in Japanese Patent Application No. 5-64268 in which a part of the controller is shown by a block diagram. In FIG. 3, a motor 40 for outputting an auxiliary torque to a vehicle steering wheel (not illustrated) is driven by a motor current IM supplied from a battery 41. The ripple component of the motor current IM is absorbed by a capacitor 42 having a large capacity (1,000 $\mu$F to 3,600 $\mu$F) and detected by a shunt resistor 43. Moreover, directions and values of the motor current IM are switched in accordance with the operation of a bridge circuit 44 having a plurality of semiconductor switching devices (e.g. FETs) Q1 to Q4 in accordance with the magnitude and direction of the auxiliary torque.

One end of the capacitor 42 is connected to the ground by a conductive wire L1. The semiconductor switching devices Q1 to Q4 are bridge-connected by wiring patterns P1 and P2 to constitute a bridge circuit 44. Moreover, the wiring patterns P1 and P2 connect the bridge circuit 44 to the shunt resistor 43. The output terminal of the bridge circuit 44 is constituted with a wiring pattern P3.

The motor 40 and battery 41 are connected to the bridge circuit 44 through the wiring pattern P3 by a connector 45 having a plurality of lead terminals. The motor 40 and battery 41 are connected to the connector 45 by an external wiring L2. The motor current IM is supplied or cut off by a normally-open relay 46 according to necessity. The relay 46, capacitor 42, and shunt resistor 43 are connected each other by a wiring pattern P4. The connector 45 is connected to the ground by a wiring pattern P5. The wiring pattern P3 serving as the output terminal of the bridge circuit 44 is connected to the connector 45.

The motor 40 is driven by a driving circuit 47 through the bridge circuit 44. Moreover, the driving circuit 47 drives the relay 46. The driving circuit 47 is connected to the exciting coil of the relay 46 by a conductive wire L3. Moreover, the driving circuit 47 is connected to the bridge circuit 44 by a conductive wire L4. The motor current IM is detected by a motor current detection means 48 in accordance with the voltage appearing at the both ends of the shunt resistor 43. The driving circuit 47 and motor current detection means 48 constitute the peripheral circuit element of a microcomputer 55 to be mentioned later.

The steering torque T of a steering wheel is detected by a torque sensor 50 and the speed V of a vehicle is detected by a speed sensor 51. The microcomputer 55 (ECU) computes an auxiliary torque in accordance with the steering torque T and vehicle speed V, generates a driving signal corresponding to the auxiliary torque by returning the motor current IM, and outputs a rotational direction command $D_0$ and a current controlled variable $I_0$ for controlling the bridge circuit 44 to the driving circuit 47 as driving signals.

The microcomputer 55 is provided with motor current decision means 56 for generating the rotational direction command $D_0$ for the motor 40 and a motor current command Im corresponding to an auxiliary torque, subtraction means 57 for computing a current deviation $\Delta I$ between the motor current command Im and the motor current IM, and PID operation means 58 for computing correction values of P (proportion) term, I (integration) term, and D (differentiation) term in accordance with the current deviation $\Delta I$ and generating the current controlled variable $I_0$ corresponding to a PWM duty ratio.

Moreover, though not illustrated, the microcomputer 55 includes a publicly-known self-diagnostic function in addition to an AD converter and a PWM timer circuit, always self-diagnoses whether a system normally operates, and cuts off the motor current IM by releasing the relay 46 through the driving circuit 47 when a trouble occurs. The microcomputer 55 is connected to the driving circuit 47 through a conductive wire L5.

Then, operations of a conventional electric-power-steering controller are described below by referring to FIG. 3. The microcomputer 55 captures the steering torque T and vehicle speed V from the torque sensor 50 and speed sensor 51, feedback-inputs the motor current IM from the shunt resistor 43, and generates the rotational direction command $D_0$ of a power steering and the current controlled variable $I_0$ corresponding to an auxiliary torque to output them to the driving circuit 47 through the conductive wire L5.

The driving circuit 47 closes the normally-open relay 46 in accordance with a command through the conductive wire L3 under a normally driving state but it generates a PWM driving signal when the rotational direction command $D_0$ and current controlled variable $I_0$ are input and applies the signal to the semiconductor switching devices Q1 to Q4 of the bridge circuit 44 through the conductive wire L4.

According to the above circuit structure, the motor current IM is supplied from the battery 41 to the motor 40 through the external wiring L2, connector 45, relay 46, wiring pattern P4, shunt resistor 43, wiring pattern P1, bridge circuit 44, wiring pattern P3, connector 45, and external wiring L2. The motor 40 is driven by the motor current IM to output a required mount of auxiliary torque in a required direction.

In this case, the motor current IM is detected through the shunt resistor 43 and motor current detection means 48 and returned to the subtraction means 57 in the microcomputer 55 and thereby, controlled so as to coincide with the motor current command Im. Moreover, though the motor current IM includes ripple components because of the switching operation of the bridge circuit 44 under PWM driving, it is smoothed and controlled by the large-capacity capacitor 42.

A vehicle controller including this type of electric-power-steering controller conventionally uses a microcomputer having a built-in mask ROM storing control software such as control data and control programs.

However, because it is necessary to secure a predetermined mask ROM fabrication period under short-time system development, it is not temporally permitted to re-fabricate a mask ROM due to re-modification of software specification and it is necessary to early fix the software specification. Therefore, this causes the loads of development engineers to increase.

Moreover, also when changing control software for a newly-developed control algorithm in order to improve the performance in a market, it is necessary to secure a predetermined mask ROM fabrication period. However, it is impossible to re-fabricate a mask ROM because of changing the control software for the newly-developed control algorithm and to early change the control software in accordance with the newly-developed control algorithm. Furthermore, to reload the control software in a market, it is necessary to prepare an inexpensive auxiliary storage.

General control software is constituted with the part of discrete corresponding data between an input/output unit connected to a controller and the controller, the part of intrinsic data (e.g. torque-sensor neutral point learning data after final combination of the torque sensor 50 serving as an input/output unit with the controller of a vehicle or trouble history data in the controller mounted on a vehicle in a market after selling the vehicle), and the part of control algorithm.

Thus, the stored intrinsic data content of the intrinsic data storage block (region) in the control software of a storage to be mentioned later corresponds to each input/output unit and the controller one to one. Therefore, to reload the control software in a market, it is necessary to change the intrinsic data storage block (region) to an unerasable block (region).

The present invention is made to solve the above problem and its object is to provide a vehicle controller making it possible to relatively inexpensively, easily, early change control software in a market after selling the vehicle correspondingly to performance improvement.

DISCLOSURE OF THE INVENTION

1. An occasionally-erasable nonvolatile memory built in a vehicle control computer and storing control processing information and auxiliary storage means for setting an unerasable region to the occasionally-erasable nonvolatile memory and updating the control processing information in an erasable region to new control processing information are used.

2. The auxiliary storage means is constituted by adding an information writing function to the occasionally-erasable nonvolatile memory of a troubleshooting unit for reading trouble history information from the memory built in the vehicle control computer.

3. The auxiliary storage means is provided with means for deciding whether the control processing information in the unerasable region of the occasionally-erasable nonvolatile memory is updated.

4. The vehicle control computer is provided with another nonvolatile memory for storing the control processing information in the unerasable region in addition to the occasionally-erasable nonvolatile memory.

5. Storage connection means for setting the occasionally-erasable nonvolatile memory to the erasable mode when the auxiliary storage is connected is used.

BEST MODE FOR CARRYING OUT THE INVENTION

Figure 1:
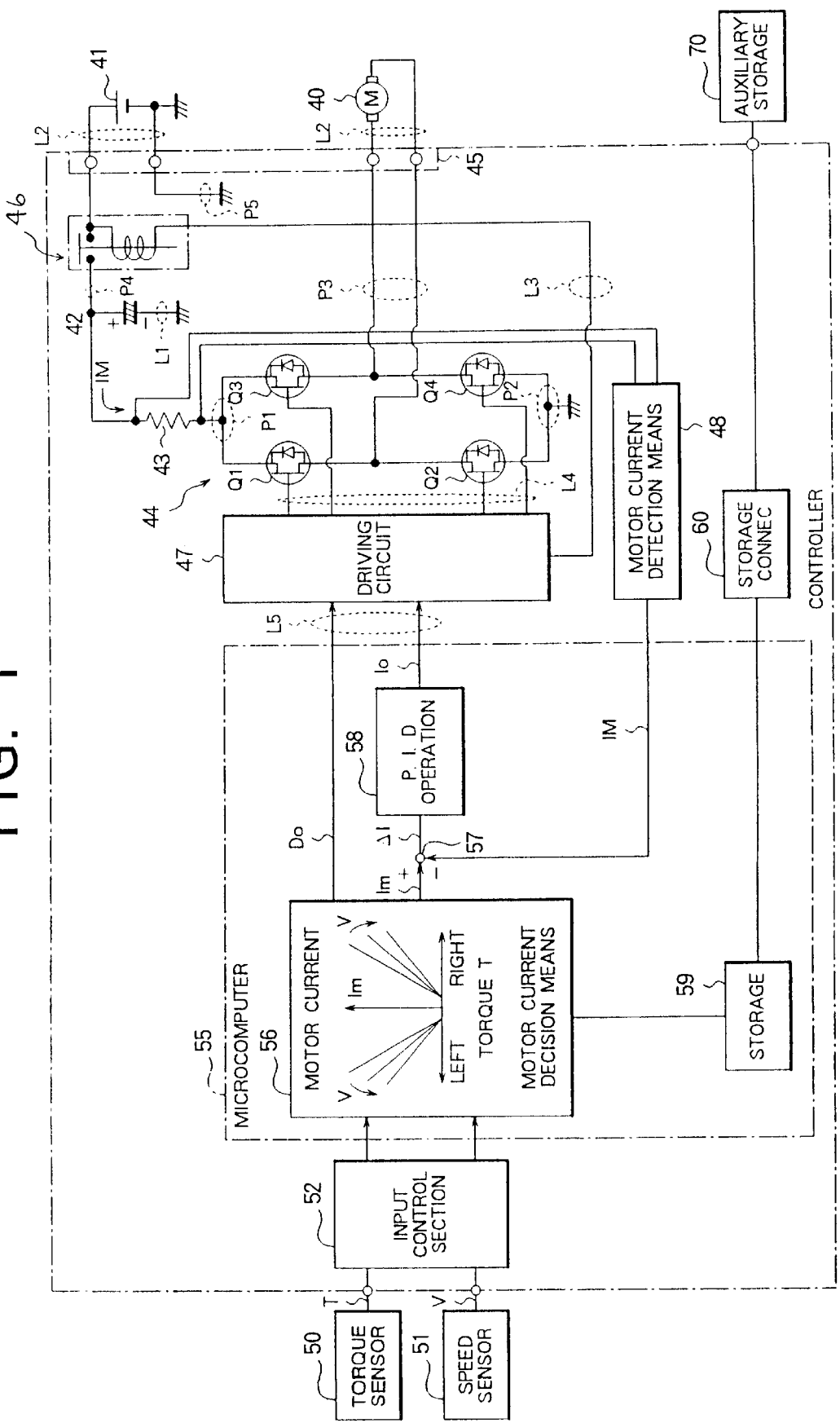
FIG. 1 is a block diagram of the electric-power-steering controller of an embodiment of the present invention.
Figure 2:
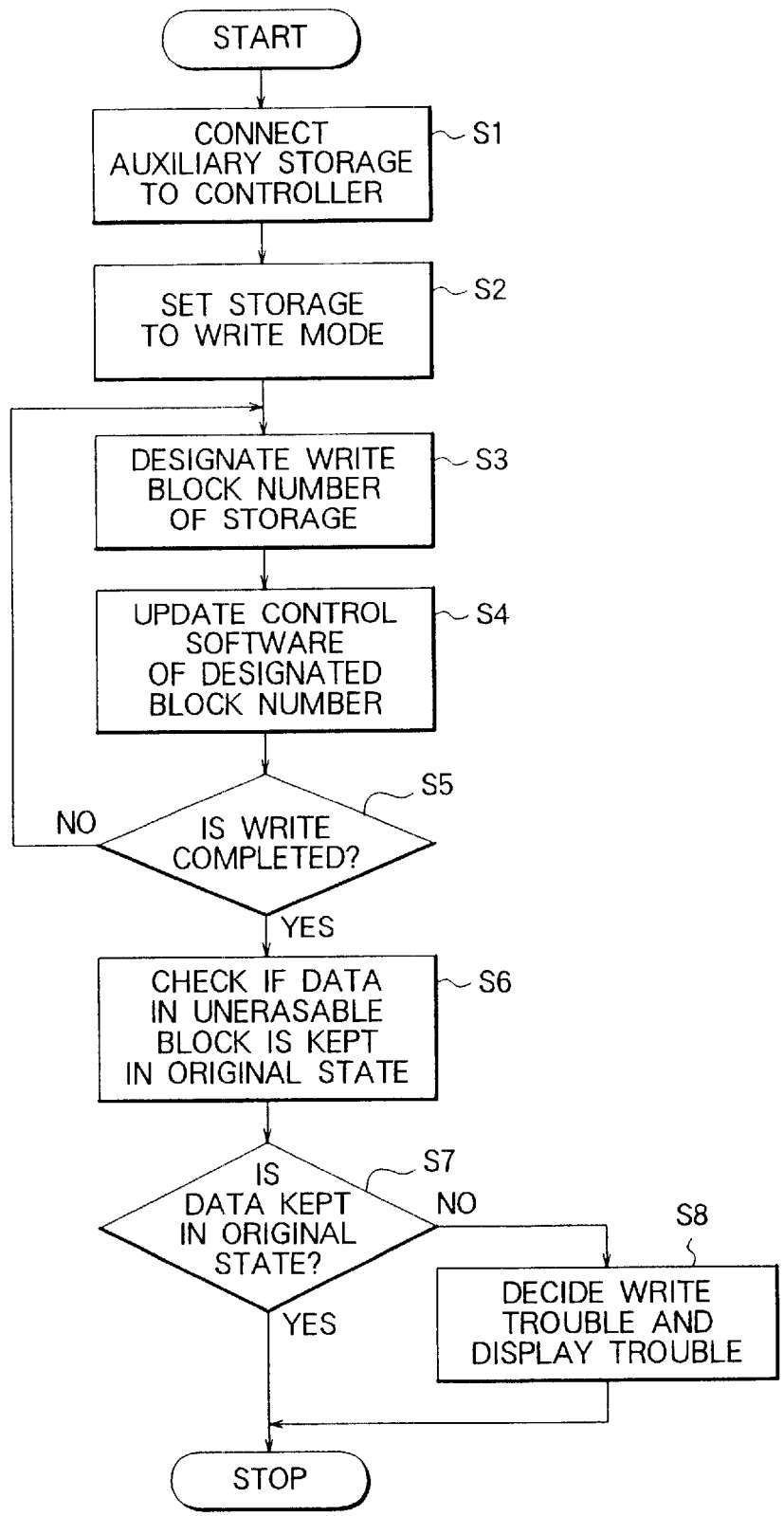
FIG. 2 is a flow chart showing a procedure for updating the control software in the electric-power-steering controller of an embodiment of the present invention.
Figure 3:
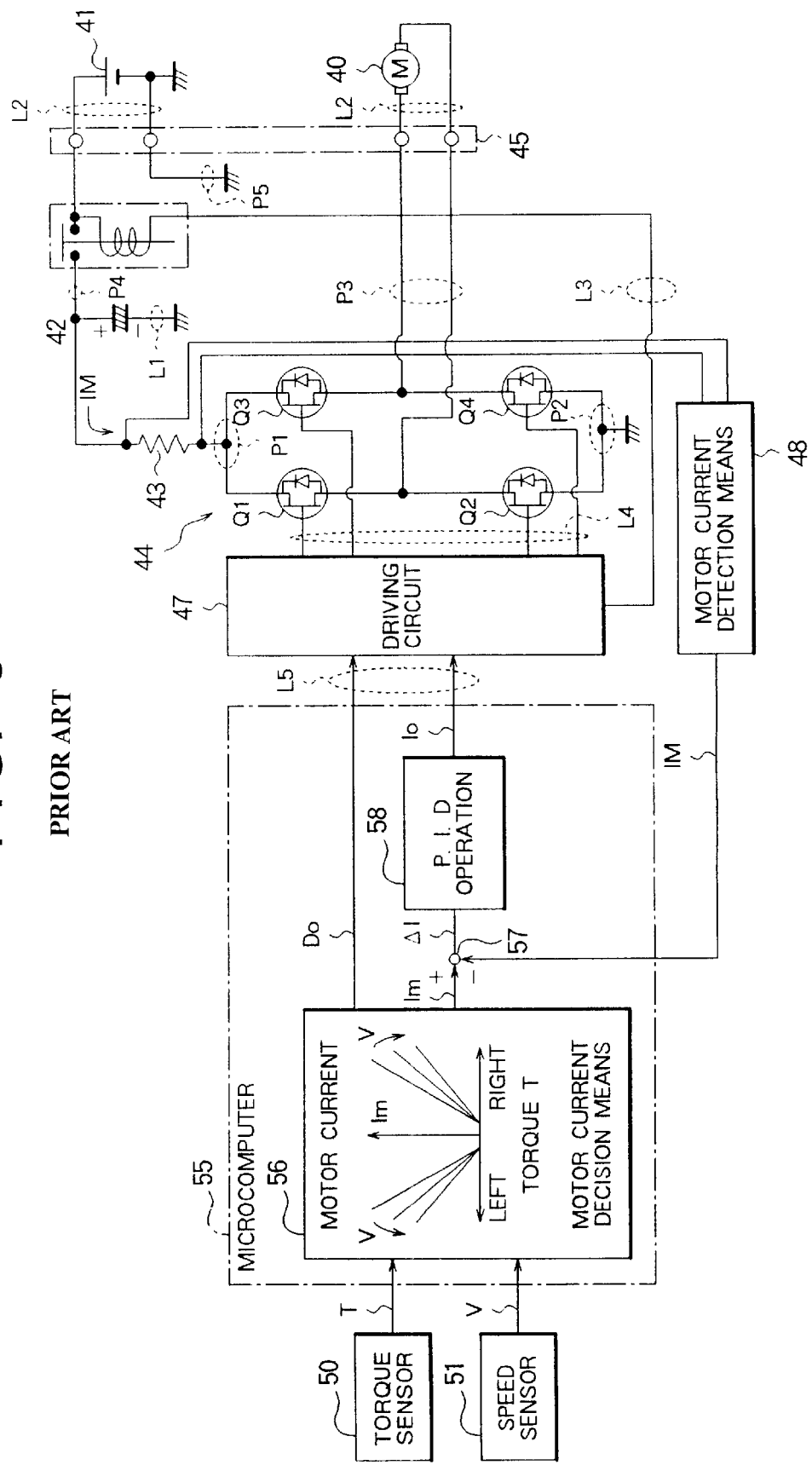
FIG. 3 is a block diagram of a conventional electric-power-steering controller.

Operations of an electric-power-steering controller of the present invention are described below mainly on the control-software updating operation by referring to the accompanying drawings. FIG. 1 is a block diagram of the electric-power-steering controller of this embodiment. FIG. 2 is a flow chart showing a procedure for updating the control software of this embodiment. In FIGS. 1 and 2, a symbol same as that in FIG. 3 shows a portion same as or corresponding to that in FIG. 3. In FIG. 1, symbol 52 denotes an input control section for inputting a sensor signal to a microcomputer from a torque sensor 50 or speed sensor 51, and 59 denotes a storage built in a microcomputer 55. The storage 59 comprises an occasionally-erasable nonvolatile memory (e.g. flash memory) capable of occasionally updating control software from an external unit. Symbol 60 denotes a storage connection circuit serving as an input/output interface disposed outside of the microcomputer 55 in the controller and 70 denotes an auxiliary storage for accessing the storage 59 through the storage connection circuit 60 to read or update control software. Then, operations of this embodiment are described in accordance with the flow chart in FIG. 2. To update control software, the auxiliary storage 70 is first connected to the controller. The storage 59 built in the microcomputer 55 is set to the erasable mode by the storage connection circuit 60 (step S2) when the auxiliary storage 70 is connected (step S1). The auxiliary storage 70 successively designates a block number for updating the control software in the storage 59 (step S3), supplies the update data to the microcomputer 55 in the controller, and the microcomputer 55 updates the control software in the storage 59 (step S4).

Control software is updated by excluding an intrinsic-data storage block (region) serving as an unerasable block (region). When designated blocks are updated, it is confirmed whether updating of every block to be updated is completed (step S5). Unless updating is completed, step S3 is restated. After updating is completed, the auxiliary storage 70 collates the original data in an unerasable block with the post data after updating other blocks in order to confirm whether the data in the unerasable block is kept in the original state (step S6).

Moreover, the storage 70 confirms whether the data in the unerasable block is kept in the original state (step S7) and when the data is kept in the original state, it decides that the data in the unerasable block (region) is not updated and completes updating. However, when it is confirmed that the data is not kept in the original state in S7, the storage 70 decides that writing is abnormal and displays a trouble indication on a not-illustrated display portion (step S8).

However, when storing a part of control software including unerasable data in another nonvolatile memory, it is unnecessary to establish an unerasable block (region) to update control software.

Then, an inexpensive method for preparing the auxiliary storage 70 is described below which is an object of the present invention. As described above, the controller incudes a self-diagnostic function to always self-diagnose whether the system normally operates. If a trouble occurs in the system, the controller stops the system and stores the trouble portion and trouble contents in the memory built in the microcomputer 55.

Moreover, a not-illustrated troubleshooting unit is prepared at the dealer side of a vehicle so that a trouble portion and its contents can be easily decided when the system is broken. By connecting the troubleshooting unit to the controller, troubleshooting can be performed. The troubleshooting unit is generally provided with an operating section and a display section and moreover, provided with a function for communication with the microcomputer 55 and a storage.

The auxiliary storage 70 has many functional sections common to the troubleshooting unit (e.g. operating section, display section, and communicative section). Therefore, by replacing a conventional control-software storing mask ROM built in the microcomputer 55 with a flash memory and adding a function which works when control software is changed to update the data in the flash memory to the troubleshooting unit, it is possible to use the troubleshooting unit as the auxiliary storage 70. Moreover, by adding a data-collation software processing function to the troubleshooting unit, an advantage is obtained that error correction of update data can be relatively easily realized.

Therefore, by remodeling an existing troubleshooting unit and adding two or three functions to the unit, it is possible to inexpensively constitute an auxiliary storage having a data update function compared to the case of newly constituting an auxiliary storage having the data update function.

As described above, according to this embodiment, an advantage is obtained that the early change of the control software for performance improvement in the electric-power-steering controller can be easily performed by a relatively inexpensive unit also in a market after selling a vehicle by making the control software erasable by the auxiliary storage 70.

By remodeling an existing troubleshooting unit, it is also possible to inexpensively constitute an auxiliary storage 70 compared to the case of newly constituting an auxiliary storage.

This embodiment is described about a case of applying the embodiment to an electric-power-steering controller. However, it is needless to say that the same advantage is also obtained by applying the embodiment to another vehicle controller (e.g. vehicle engine controller).

Industrial Applicability

The present invention provides a vehicle controller making it possible to early change control software by a relatively inexpensive unit also in a market after selling a vehicle by using a control microcomputer having a built-in nonvolatile storage (e.g. flash memory) as a storage for storing the control software.

What is claimed is:

1. A vehicle controller comprising:

an occasionally-erasable nonvolatile memory built in a vehicle control computer and having an erasable region for storing control processing information;

unerasable region setting means for setting an unerasable region for storage of intrinsic data in said occasionally-erasable nonvolatile memory; and auxiliary storage means for updating the control processing information stored in said erasable region to new control processing information, wherein said auxiliary storage means includes means for determining whether the intrinsic data stored in the unerasable region of said occasionally-erasable nonvolatile memory has been modified by comparing the intrinsic data stored in the unerasable region before the control processing information stored in the erasable region has been updated with the intrinsic data in the unerasable region after the control processing information stored in the erasable region has been updated.

2. The vehicle controller according to claim 1, wherein said auxiliary storage means comprises a troubleshooting unit for reading trouble history information from a memory built in a vehicle control computer, said troubleshooting unit including an occasionally-erasable nonvolatile memory.

3. The vehicle controller according to anyone of claim 1, further comprising a storage connection means for setting the occasionally-erasable nonvolatile memory to an erasable mode when the auxiliary storage is connected to the vehicle control computer.

4. The vehicle controller according to claim 1, wherein a vehicle control computer is provided with a second nonvolatile memory for storing unerasable control processing information.

* * * * *